United States Patent [19]
Hei et al.

[11] Patent Number: 5,868,859
[45] Date of Patent: Feb. 9, 1999

[54] USE OF INFRARED RADIATION IN DETECTION METHODS TO DEFOAM AQUEOUS SYSTEMS

[75] Inventors: Robert D. Hei, Oakdale; Keith D. Lokkesmoe, Savage; Jay T. Kummet, Apple Valley; Scott P. Bennett, Stillwater, all of Minn.

[73] Assignee: Ecolab Inc., St. Paul, Minn.

[21] Appl. No.: 729,140

[22] Filed: Oct. 11, 1996

[51] Int. Cl.$^6$ .................................. B08B 3/04; B08B 3/08
[52] U.S. Cl. ........................... 134/18; 73/60.11; 95/155; 95/157; 134/253; 222/54; 250/357.1; 436/55
[58] Field of Search ........................... 134/18, 25.1, 25.3; 95/155, 157; 436/55; 422/28, 32; 250/338.5, 343, 357.1; 426/286, 329, 335; 222/23, 52, 54; 73/60.11

[56] References Cited

U.S. PATENT DOCUMENTS

| | | | |
|---|---|---|---|
| 4,392,782 | 7/1983 | Kuehn, III et al. | 417/36 |
| 4,563,274 | 1/1986 | Rothon et al. | 210/101 |
| 4,756,670 | 7/1988 | Arai | 417/43 |
| 5,005,992 | 4/1991 | Dreschmann et al. | 384/484 |
| 5,026,989 | 6/1991 | Merkel | 250/338.1 |
| 5,094,112 | 3/1992 | Hoefelmayr et al. | 73/861.04 |
| 5,167,243 | 12/1992 | Cowan et al. | 131/290 |
| 5,263,112 | 11/1993 | Holt | 385/147 |
| 5,273,060 | 12/1993 | Hill, III et al. | 134/57 R |
| 5,305,915 | 4/1994 | Kamysz et al. | 222/63 |
| 5,390,541 | 2/1995 | Feller | 73/204.25 |
| 5,392,646 | 2/1995 | Yajima | 73/204.19 |
| 5,397,028 | 3/1995 | Jesadanont | 222/1 |
| 5,409,713 | 4/1995 | Lokkesmoe et al. | 422/28 |
| 5,417,233 | 5/1995 | Thomas et al. | 134/93 |
| 5,446,516 | 8/1995 | Burbury et al. | |

FOREIGN PATENT DOCUMENTS 7-114955   12/1995   Japan.

OTHER PUBLICATIONS

Patent Abstracts of Japan Publication No. 06285360, published Oct. 11, 1994.
Patent Abstracts of Japan Publication No. 51122671, published Oct. 26, 1976.
Degussa Corporation NASILSO Precipitated Silicas for Defoamers product information, undated.
Ducey Chemical Food–Grade C.S. Silicone Antifoams product brochure, undated.
American Ingredients Company PATCOTE® 305K and 502K product undated.
Chromalox® 2001 PLUS!–Microprocessor–based Temperature and Process Controller User's Manual 0037–75093, Issue Date: Feb. 1991.
Raytek® Thermalert TX product brochure.
Raytek® Thermalert ET product brochure.
Raytek® Raynger® & Thermalert® Product Families product brochure.
Chemax GWPD–655 Potato Defoamer product brochure.

*Primary Examiner*—Jan Ludlow
*Attorney, Agent, or Firm*—Merchant, Gould, Smith, Edell, Welter & Schmidt, P.A.

[57] ABSTRACT

The creation of a substantial volume of foam on the surface of an aqueous medium can reduce the apparent thermal IR emission substantially when compared to that of the aqueous medium free of foam. This difference in temperature (infrared emission) can be used to control a defoaming process or the addition of a defoaming agent to control foam in the aqueous medium. The apparent thermal infrared emission of foam is less than that of the aqueous medium. As the thermal IR emissions drop as foam develops, the difference between the apparent temperature of the foam and the temperature of aqueous medium increases. Such a difference in temperature can be used to control use of a defoaming process or agent. As the foam volume is reduced, the addition of a defoaming composition is substantially reduced or stopped. During the control method, a predetermined limit is established at which the defoaming process or composition is introduced into the aqueous medium. Further, the method permits the amount of defoaming agent added to the aqueous medium to be in proportion to the difference in infrared emission above the preset predetermined limit. The temperature of the foam is best measured using IR methods.

39 Claims, 8 Drawing Sheets

USE OF INFRARED RADIATION IN DETECTION METHODS TO DEFOAM AQUEOUS SYSTEMS

FIELD OF THE INVENTION

When an aqueous medium is agitated and heated, the contents of the aqueous medium can promote foaming. The invention relates to the control of such foaming in aqueous media. More particularly, the invention relates to controlling foaming in an aqueous media containing organic or inorganic material either dissolved or suspended in the aqueous medium. Such aqueous media can contain a variety of species including organic and inorganic small molecules or larger polymeric natural or synthetic molecules. Such molecules or byproducts and/or impurities thereof can cause substantial foaming.

Still further, the invention relates to the reduction of foam or foam control in an aqueous medium containing vegetable matter in a flume device used to transport the aqueous medium and vegetable matter. In the processing of agricultural produce, aqueous media are often used in the transport of freshly picked produce from a production zone to a processing zone using the flume. Such media can foam as a result of agitation of the medium in the presence of inorganic and organic vegetable matter in the flume, and can also foam because of the presence of microbial growth or because of one or more materials added to the foam to suppress microbial growth. The invention relates to methods of controlling foaming of such aqueous media containing substantial quantities of dissolved or suspended vegetable or microbial matter or antimicrobial materials.

BACKGROUND OF THE INVENTION

The control of the generation of foam from aqueous media during processing has been a continuing problem for many years. A number of chemical classes of active defoaming materials have been proposed for use in defoaming aqueous systems containing a variety of foaming materials. Such defoamers have been more or less effective depending on the concentration of foaming materials, the temperature of the aqueous media, the geometry of pumps, tanks or lines, the degree of mixing or agitation, and the mode of addition of an effective defoaming concentration of the defoaming composition. Control of the concentration of a defoaming composition in the aqueous medium is not always easily accomplished.

Conventionally, manual foam control has been attempted simply by visually detecting foam accumulation and reducing foam with a manual addition or episodic machine addition of defoaming agents into the aqueous medium.

Automatic foam control has also been attempted. Automatic foam detection is accomplished using ultrasonic detectors that can generate a signal proportional to foam height. Additionally, mechanical floating devices sensitive to foam height have also been used. Conductivity probes that can detect a difference in conductivity between foam and bulk aqueous solution have been used. Electric eyes that can be positioned to detect foam have been attempted. These systems have advantages and disadvantages. In certain cases, ultrasonic and other probes can be impaired by filming, soiling or foam adhesion when the probe comes in contact with foam or with foamable liquid. These control systems have resulted in loss of sensitivity and control, often resulting in failure to control foaming. Further, often ultrasonic and other devices that determine foam height often have problems in determining foam height as water levels fluctuate. The uncertainty in foam height caused by varying water levels can be a significant problem in long term consistent foam control. The industry has sought other methods for foam distribution and control.

Measurement of thermal energy by detecting and quantifying thermal infrared emissions is known in a variety of applications. Burbury et al., U.S. Pat. No. 5,446,516 teaches the use of temperature detection to maintain a reaction at an optimum temperature for best yield. Thomas et al., U.S. Pat. No. 5,417,233 teaches the use of an infrared beam in a low product alarm system. When a product is consumed, the product can no longer prevent an infrared beam from being detected. The detection of the beam then triggers a low product alarm to replace the consumed product. Jesadanont, U.S. Pat. No. 5,397,028 teaches a method for applying a liquid disinfectant to a users hands or other body part. The dispenser automatically senses the presence of the users hands or other similar body parts using an infrared sensing mechanism. Fender, U.S. Pat. No. 5,105,992 discloses a infrared sensor that detects a person hand to prompt dispensing a liquid soap. Kamysz et al., U.S. Pat. No. 5,305,915 uses an infrared sensor triggered dispenser to dispense soap to a user. Yashuhito, U.S. Pat. No. 5,392,646 teaches a method to sense the flow rate of a fluid using the temperature coefficient of resistance of an RC circuit. Feller, U.S. Pat. No. 5,390,541 similarly uses the modulation of a temperature sensor to predict flow rates. Hill et al., U.S. Pat. No. 5,273,060 uses an infrared sensor to detect a combustion or an explosion to prompt a fire extinguishing system. Holt, U.S. Pat. No. 5,263,112 uses an infrared fiber optic distribution sensor to detect the degree of twist or stress in a coiled optical cable. Cowan et al., U.S. Pat. No. 5,167,243 discloses a disinfestation system for agricultural products using a thermal conductivity detector to detect the concentration of carbon dioxide. Merkel, U.S. Pat. No. 5,026,989 teaches an infrared sensor used to detect the presence of a heated adhesive on a substrate to control adhesive amounts. Arai, U.S. Pat. No. 4,756,670 teaches a system using a ratio of heat dissipation coefficients of a pair of electrically heated matched temperature sensitive devices to detect flow in a liquid system. Kuehn, III et al., U.S. Pat. No. 4,392,782 teaches a system for controlling liquid level using vertically spaced thermistors that when immersed or cooled, result in a change of resistance, thus detecting the liquid level.

In summary, the prior art does contains teachings of a variety of uses for thermal detection of IR emission or radiation but does not contain a teaching that the different thermal properties of foam and an associated aqueous foam-generating liquid can be used to trigger the addition of a defoaming agent into an aqueous medium that can generate foam to control foaming.

BRIEF DISCUSSION OF THE INVENTION

Foam generated from an aqueous medium can be controlled by the addition of a defoaming agent or a foam control composition. Control of the amount or timing of the addition of an amount of a defoaming composition to the aqueous medium can be determined and controlled by thermally measuring the amount of foam that forms on the surface of the aqueous medium. The amount, thickness or degree of foam formed on the surface of the bulk aqueous medium can be established by measuring the difference between a temperature derived from the thermal IR emission from the foam mass when compared to the temperature of the aqueous medium free of foam. In a preferred mode, the temperature of the foam is measured by an IR sensor placed above the foam mass and the temperature of the bulk medium is measured with any conventional temperature measuring means. The thermal properties of foam are different than bulk liquid. Foam acts as an insulating layer. As a result, we have found that the foam generated from an aqueous medium at a constant temperature will have a temperature, as measured by the thermal IR emission, substantially less than the temperature of the aqueous medium for liquids with a temperature greater than ambient. The temperature of the medium can be measured using any conventional means including thermometers, thermocouples, thermistors, IR detectors, etc. The temperature of the foam is most conveniently measured by IR detector.

As foam accumulates on the surface of the aqueous medium, the difference in temperature, as measured by infrared thermal emission, between the foam and the temperature of the aqueous medium increases. The foam temperature is measured to be cooler than the aqueous medium because of the insulating nature of the bubble mass. As the difference between these measurements becomes greater than a predetermined limit, the aqueous medium can be treated with a defoaming process or agent. As long as the thermal infrared emission of the foam is less than the thermal infrared emission of the aqueous medium and the difference in temperature is greater than a preset limit, the foam and medium can be continuously defoamed or defoamed according to a machine program. At some point, the defoaming process or defoaming treatment will successfully reduce foam to a degree such that the difference between the thermal emission of any remaining foam and the temperature of the aqueous medium without foam is less than the predetermined limit. At such point, the defoaming process or defoaming treatment can be interrupted. As long as additional foam does not accumulate, no additional defoaming process or defoaming treatment to the aqueous medium is necessary. If foam again accumulates and the difference in infrared thermal emission again increases past the preset limit, then the defoaming treatment or process can be initiated in the aqueous medium thus controlling the foam.

For the purpose of this patent application the term "aqueous medium" comprises a liquid mass comprising substantial proportion of water that can also contain either dissolved or suspended organic or inorganic matter.

Infrared radiation is a part of the electromagnetic energy spectrum. This spectrum is a continuum with no clear boundaries between regions of radiation. All electromagnetic radiation is characterized by frequency or wavelength. Wavelength and frequency are related. The infrared radiation band or region is generally assigned to a region roughly between the visible light band or region and the radio wave band or region, in the electromagnetic spectrum measured in wavelength or frequency. The term "thermal infrared emission" means emitted electromagnetic infrared.(IR) energy in a broad or narrow band having a wavelength between about 0.7 to 1000 $\mu$m, 0.7 to 100 $\mu$m, 0.7 to 10 $\mu$m or any measurable portion or portions thereof (or the corresponding frequency). The term "defoaming process" indicates a mechanical foam reduction in which the foam or individual foam bubbles are collapsed using mechanical defoaming means such as a screen, baffle, reciprocal member or other mechanical apparatus that moves into or through the foam mass to reduce foam volume. The term "defoaming" refers to the addition of a defoamer or foam control agent to a foamable aqueous mass or volume. The term "foam control agent" or "defoamer" refers to an intentional addition of a chemical that when contacted with a foam mass or associated aqueous liquid, will reduce foam volume, stability, change foam bubble size or bubble wall structure or have any other effect on the foam mass tending to reduce foam volume inherently or through the additional effect of a defoaming process. IR is a common contraction representing Infrared Radiation.

In many applications, the generation of substantial quantity of foam can be merely an annoyance. However, in certain applications, the foam can prevent proper operation of equipment or can be harmful to the apparatus containing the aqueous medium. Should a substantial volume of foam be drawn into lines leading to a pump or other mechanical device, the foam can cavitate or otherwise prevent the proper flow of liquid through the line, the pump or other device. A pump exposed only to foam can become overheated and can be damaged or destroyed. Accordingly, for the purpose of this application, the accumulation of a substantial volume of foam relates to the production of sufficient foam that is either unwanted, undesirable or unsightly or is an amount such that if the foam enters an apparatus associated with the aqueous medium, the foam could prevent proper operation including inappropriate or incomplete cleaning, spills of foam out of the apparatus onto closeby surfaces leaving undesirable residue or microbial growth sites or harm working parts of the apparatus.

BRIEF DISCUSSION OF THE DRAWINGS

DETAILED DESCRIPTION OF THE INVENTION

Figure 1:
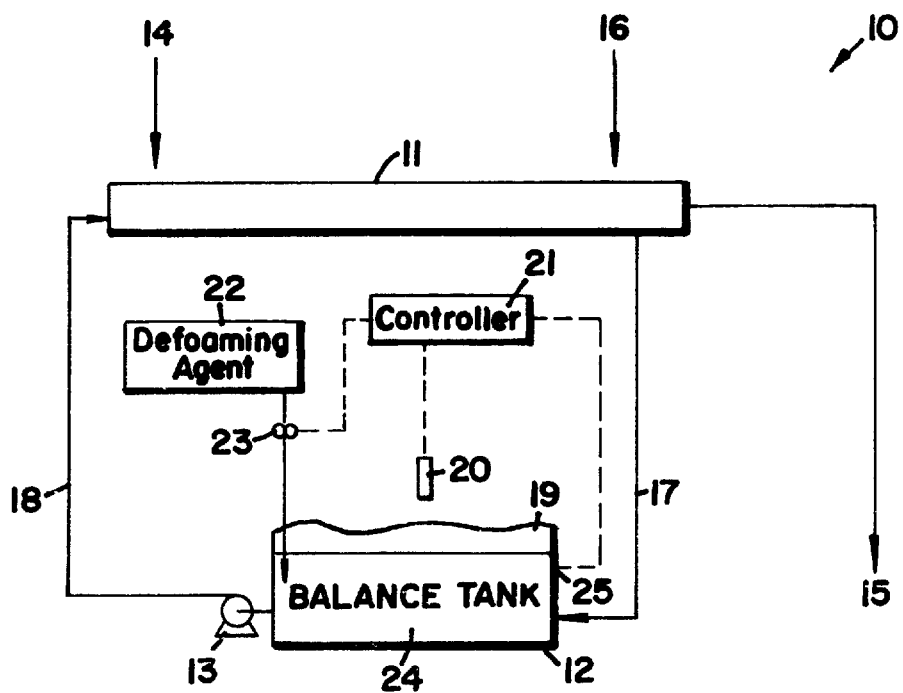
FIG. 1 is a block diagram of a schematic foam detection and control apparatus that uses thermal infrared emission to measure the temperature of a foam. The foam temperature is compared to the temperature of the aqueous medium to control addition of a foam control or defoaming agent.

Foam control agents or defoamers use foam characteristics to reduce foam. Foam is a non-equilibrium dispersion of gas bubbles or vapor in a relatively smaller volume of liquid. The gas content of a foam is greater than the volume of liquid required to produce the foam volume. An essential ingredient, in the liquid-based foam, is materials that are dissolved or suspended in the liquid medium that have surface active, pseudo-surfactant or other surface properties that tend to support or promote foam generation. Such materials reside at the interface between gas and foam and are responsible for the tendency of the liquid foam and the stability of the resulting dispersion of bubbles.

While foam has certain desirable properties, unwanted generation of foam is a common problem affecting the efficiency and speed of a vast number of industrial processes involving mixing or agitating of multicomponent liquids. In all cases, control of foam rheology and stability is desired. These physical properties, in turn, are determined by both the physical chemistry of the liquid-gas or vapor interface and by the structure formed from the collection of gas bubbles. Foam made from a clear liquid often appears to be homogeneous and white. The foam often takes the color of the liquid medium. When observed more closely, however, foam has an intricate structure formed by the close packing of distinct gas or vapor bubbles. Foams often have a common distribution of large polyhedron bubbles in the top of a foam mass with smaller spherical bubbles at the bottom. Average bubble size is often around 1 to 2 millimeters depending upon aqueous composition and foam age. Liquid tends to drain from the top of a foam mass to the bottom resulting in the different bubble sizes and liquid concentration. Further, the bottom of a foam mass tends to be generally more wet, i.e., has greater amounts of aqueous liquid per volume of gas. By non-equilibrium state of foam, we mean that the foam generally tends to have a uniform bubble shape and size when generated, but after aging, the foam size and type tend to change to the common larger drier top structure with a smaller wetter bottom foam structure.

The stability and rheology of a foam are closely interrelated with chemical composition and physical structure. The physical chemistry of the liquid-vapor interface in a modification by materials dissolved or suspended in the aqueous liquid plays a primary role in foam generation. Foaming is a surface phenomenon, anything that effects the surface causing foam can be considered a foaming surfactant. The interaction of defoaming processes and defoaming treatments at the foam aqueous liquid vapor interaction are critical. In foam production or reduction the behavior of individual molecules in solution and near a vapor liquid interface and the influence of these materials on interfacial forces is considered critical. In aqueous solutions, the chemical constituents most commonly responsible for foaming are surfactants, i.e., surface active agents and other materials that tend to have a more hydrophilic portion of the molecule and a more hydrophobic portion of the molecule. At a concentration called the critical micelle concentration for the specific material, the molecules can align and promote foam formation. A large number of molecules in addition to synthetic surfactants can cause foaming. For example, protein and peptide residues can contain relatively hydrophobic and relatively hydrophilic regions. Their presence suspended or dissolved in aqueous solutions can be foam producing. A large number of other components can also cause foaming including natural polysaccharide or cellulosic materials, natural fats such as phospholipids, partial esters of glycerol and a fatty acid, fatty acid molecules, and a large variety of other materials that can be derived from natural sources.

Foams can be reduced in volume using three commonly understood mechanisms. Foams comprise liquid and vapor components that have different densities. The liquid material can drain from a liquid vapor interface region resulting in a thinner bubble wall. In such foams the fluid in the foam mass tends to drain by gravitational force to the bottom of the foam mass, typically the interface between the aqueous medium and the foam volume. As the liquid drains from the foam mass, the drainage proceeds until there is a vertical, hydrostatic pressure gradient that offsets the effective gravity on the liquid phase. Such drainage can increase the effect of defoaming processes or defoaming treatments since foam stability tends to be reduced in foams with reduced liquid content.

Foam mass can also be reduced through film rupture. Foams evolve through the coalescents of neighboring bubbles via film rupture. Such rupture occurs if the nature of the surface active components or other materials dissolved or suspended in the liquid is such that the repulsive interactions and flow are not sufficient to keep neighboring bubbles apart. Bubble coalescents can increase as the liquid part of the foam drains and as reduced liquid content reduces the ability of the liquid to separate neighboring bubbles. Rupture can be increased by reducing the impact of surface active agents and other materials dissolved or suspended in the aqueous liquid by ensuring that the surface active agents cannot provide a sufficiently large barrier between bubbles. As the barrier is reduced by the effect of the foam, antifoam process or the defoaming treatment, bubble rupture then becomes more common.

Other external perturbations such as thermal cycling, mechanical shearing, compositional change by evaporation or a chemical or particulate additives can also greatly improve the rate of bubble or film rupture. In very long lived foams, foams can continue to be thermal dynamically not in equilibrium because the gas inside foam bubbles can diffuse resulting in foam destruction. However, for most applications gas diffusion is a negligible component in foam stability.

Many industries now rely on the efficient and economical use of defoamers both as a process aid in product manufacture and to increase the quality of the finished product in subsequent application. The most obvious use of defoamers as process aids is to increase holding capacity of vessels and to improve efficiency and to protect process equipment. Defoamers are also used to improve filtration, dewatering, washing and drainage of suspensions, mixtures or slurries. Examples of industrial operations that benefit from defoaming include oil well pumping, gas scrubbing at petro chemical plants, polymer and chemical synthesis and processing, textile dyeing and finishing, leather processing, paint and adhesive manufacture. Control of foam in aqueous media is used in a variety of chemical processing including aqueous media containing surfactant materials, crop residue, peptide residue, and any other material having surface active properties that can cause aqueous foam generation, control of waste water and sewage, food preparation, etc. is common. Most commonly available commercial defoamers are formulated specialty chemicals. A number of the specially formulated defoaming materials are discussed in J. C. Colberg, Foam and Emulsion Control Agents and Processes: Recent Developments, Noise Delta Corp., Parkridge, N.J. (1981); and H. D. Kerner, Foam Control Agents, Noise Data Corp., Parkridge, N.J. (1976). Other useful reviews of defoaming materials are those shown in R. Hoffer and coworkers in Ulman's Encyclopedia of Industrial Chemistry, Volume A, 11, Fifth Edition, VCH Publishers, New York (1988) pp. 465–490; J. W. Simons et al., Handbook of Coatings Additives, Marcel Dekker, Inc., New York (1987) pp. 147–175 and M. J. Owens in Encyclopedia of Polymer Science and Engineering, Vol. 2, Second Edition, John Wiley & Sons, Inc., New York (1985) pp. 59–72. Active ingredients in defoaming agents include liquid phase components comprising hydrocarbon defoamers, polyether defoamers, silica defoamers, silicone defoamers and fluorocarbon defoamers. Other hydrocarbon defoamers include kerosene and other paraffinic and naphthinic mineral oils, vegetable oils, oil derivatives such as ethoxylated rosin oil are known. Hydrocarbon defoamers also include organic polymers such as polyisobutylene, polyalkylene oxide, polyether, polyamines and others. The polyether group typically includes poly(alkylene oxide) homopolymers and copolymers. Both heteric and block copolymers comprising repeating portions derived from ethylene oxide and/or propylene oxide can be used to reduce foam in aqueous mixtures. Additionally, high molecular weight adducts of propylene oxide with polyhydric alcohol such as ethylene glycol, glycerol, pentaerythritol, etc. can be useful. Silicone oils are known to be particularly effective in antifoaming activity. Polydimethylsiloxane is widely used in products for defoaming where thermal stability is important. Lastly, fluorocarbon materials are expensive but effective antifoaming fluids. Fluorocarbon oils and fluorine containing amides such as N-(alkylamino-trimethylene) perfluoro octanamides are useful antifoaming additives. A number of antifoaming additives can cross lines between these identified classes such as fluorosilicones including polytrifluoropropylmethyl siloxanes and other fluorosilicones. The defoaming action of many active defoaming agents are enhanced through an interaction between the typically liquid defoaming composition and a solid particulate. For example, polydimethylsiloxane is effective but has enhanced foam inhibiting activity in aqueous surfactant solutions when compounded with a hydrophobic silicon material. Three solid phase component classes are known hydrocarbon solids, silicone solids and fluorocarbon solids. Such defoamers can also contain ancillary agents that can maintain or improve defoaming activity. Often effective defoaming properties require a single phase defoaming agent. Since such defoaming agents often comprise liquid and solid components, the defoaming agent can often require an emulsifier to maintain a single phase defoaming composition. Additionally, defoaming compositions can be incorporated with carrier materials to produce an easily handleable, readily dispersible system for delivering the active defoaming components to the foaming system. A preferred defoamer comprises a mixture of a hydrophobic silica, a silicone and a nonionic wetting or compatibilizing agent.

The defoamer acts to reduce foaming by enhancing the instability of the foam by increasing drainage effects, increasing gas diffusion between bubbles, reducing surface elasticity and by destabilizing other thin film effects. The amounts of the defoaming composition to be added to a foaming aqueous system is often empirically determined. Experiments are conducted with the defoamer composition and required defoaming concentrations in the aqueous media are determined simply by adding the defoamer in increasing amounts until the degree of required defoaming is obtained. In some processes little or no foaming can be tolerated. However, in most processes some amount of defoaming can be tolerated. However, commonly the use of a defoamer in an amount of about 50 to 2500 parts by weight of the defoamer composition per million parts by weight of the aqueous solution, preferably about 100 to 2000 or 200 to 1500 parts by weight per million parts by weight of the aqueous solution can be used initially. Such amounts can be adjusted after experience with a defoaming system is accumulated.

During food processing, the aqueous medium can contain a variety of components derived from agricultural processes associated with the fruits or vegetables. The materials include insecticides, herbicides, fertilizers, organic and inorganic vegetable/fruit matter, etc. One common material is an anti-microbial used to reduce the growth or numbers of microbs that can grow on the plant matter or in the aqueous medium. Such antimicrobials include active halogen materials, small molecule compounds, ozone, peroxy compounds, peracetic compounds, hydrogen peroxide, etc.

The amount or volume of foam, or degree of defoaming, is monitored using an infrared sensor or detector. Common infrared detectors fall into two classes, thermal and quantum (or photon) detectors. A thermal detector has a blackened surface that absorbs incident radiation at all wavelengths in which radiation manifests itself as heat. The resulting temperature change in the sensor element produces the detector signal. In quantum detectors the infrared absorption excites the electrons, altering an electrical property of the detector, which is measured (photodetector properties). Thermal detectors have sensitivities that are independent of wavelength but are slow because the temperature change must occur. Quantum detectors are generally faster and more sensitive, but have a sensitivity that rises smoothly with increasing wavelength up to a long wavelength limit beyond which sensitivity drops rapidly.

Infrared detectors are typically engineered for a particular temperature range. In other words, infrared detectors for high temperature processing, such as manufacture of steel or other molten metals, can operate at a very high temperature range (2000°–3000° F.). Infrared sensors for use in this application are relatively low temperature infrared sensors that can detect the temperature of aqueous mediums typically below the boiling point of water (100° C.). The preferred infrared sensors of the invention are sensors that detect common aqueous temperatures and are adapted to the acquisition of temperature data using modern computer or data processing techniques. Such infrared sensors can generate a signal that can be introduced into a computer through a conversion module. Such computers can be common lap top or desk top type computer systems.

The infrared sensor can be mounted at any convenient location with respect to the aqueous medium at a site where foam accumulation is representative of foam generation in the aqueous system. Some empirical testing is required for optimal infrared sensor location. The sensor can be placed in a housing if necessary ensuring that the infrared transmission of the housing blocks no important quantity of infrared radiation. Commonly, the infrared sensor is positioned at a location above the aqueous medium such that the sensor remains above the level of any foam layer generated. Commonly, foam layers generated are less than 200 inches, commonly less than 100 inches and often less than 60 inches in depth.

In practice, the 0.7 to 14 micron ($\mu$m) band is commonly used for infrared measurement for convenience purposes, however, sensors can be engineered to detect infrared radiation throughout the infrared band. The temperature of a material is typically the source of infrared energy emitted by the object. In other words, the energy emitted by an object can be measured by infrared thermometer. Such a thermometer typically can be contacted by infrared energy that is obtained from the ambient environment, emitted from the system or transmitted through the system. An infrared sensor should be mounted in such a location such that the emitted energy of the system is measured. Adjustments to the thermometer can be made to remove the interference from the environment.

For the purpose of this invention, we have found that the Raytek® Thermalert non-contact temperature sensors for process monitoring and control are preferred infrared sensing devices. The ET sensors can measure temperature in chemical processing equipment. The ET series has the temperature range that brackets the temperatures of the aqueous medium and the foams generated by the aqueous medium permitting convenient addition of foam control agents. The selection of an infrared sensor that has an appropriate focus on the foam generating site can be selected by one of ordinary skill in the art.

The temperature of the aqueous medium can be determined using the infrared sensors of the invention or any other temperature generating measurement. Thermocouples, thermistors, bimetal strips, mercury thermometers, alcohol thermometers, etc. can all be used to measure the temperature of the aqueous medium. Such a temperature can be used in comparison to the infrared emission temperature of the foam for control of the addition of the foam control agent. The temperature of the aqueous medium can be read manually by the operator or can be measured electronically using a thermistor or thermocouple and such data can then be acquired by the computer/controller for comparison to the temperature of the foam layer. Such a measurement can be taken at any convenient place for measurement of the aqueous medium. The aqueous medium temperature can be measured in the process unit, an accumulation zone, a treatment zone, or in any line or pump convenient for measurement. The temperature of the aqueous medium can be controlled using common control equipment and that set point can be used as a program set point in the computer controller. In such an instance, a continuous measurement of the temperature is not required. The set point comprising the measurement required for addition of foam control agent.

A control system to compare the temperature of the aqueous medium to the infrared emission of the foam layer generated on the aqueous medium can be used. Such a control system can comprise an operator comparing temperatures generated by tie system. However, an automatic microprocessor-based control system is preferred such as those made by Chromalox®. Automatic control systems for dosing aqueous media with appropriate chemicals have been used for many years. Such control systems can be programmed with a predetermined temperature difference limit. When this temperature difference limit is exceeded, the system can cause the addition of the foam control agent into the aqueous medium. The amount of foam control agent can be pulsed into the aqueous medium or can be added continually until foam control is achieved. Under the pulsed addition mode, a constant amount of the foam control agent is pumped into the aqueous medium in a duty cycle such that during a ten minute cycle, (e.g.) the pulse will occur cyclically at every minute until foam control is achieved. Other duty cycles can be used such that during a one minute cycle, the pulse can have a ten, twenty, thirty or fifty second cycle. The cycle is repeated until foam control is achieved. Alternatively, the control system can add the defoamer material continually until foaming is controlled. Typically, using either defoaming method, a concentration of defoamer is achieved that ranges from about 50 to about 2500 ppm of defoaming agent in the aqueous medium, preferably about 100 to about 1000 ppm of foam control agent in the aqueous medium. A variety of commercial control systems are available and can be selected by one of ordinary skill in the art.

DETAILED DESCRIPTION OF DRAWINGS AND EXPERIMENTATION

FIG. 1 shows a block diagram or a schematic of the infrared foam detection and control process and apparatus of the invention. Broadly, FIG. 1 shows a foam system and foam controller apparatus 10 comprising a flume 11 and an aqueous medium 24 in a treatment tank 12 for the addition of a defoaming agent to the aqueous medium. A flume is an device using a mobile stream of an aqueous liquid to transport a product stream such as agricultural produce from an unloading station into and through a processing plant. The foam control tank 12 contains the aqueous medium 24 that is moved through the flume 11 using pump 13. In the operation of the flume, aqueous medium from the tank 12 passes through pump 13 into the flume 11. Fruits or vegetables enter port 14 from transport trucks or other flume systems travel along the flume and are removed from the flume at processing port 15. The water in flume 11 and the tank 12 can generate substantial quantities of foam as a result of foreign matter, dirt, agricultural residue, antimicrobial materials, fertilizer, insecticide, fruit or vegetable matter and any other material arising in the agricultural location. Such material becomes dissolved or suspended in the flume liquid and requires foam control. The flume is maintained with an adequate supply of water by supplying make up water at make up inlet 16. The flume generally contains sufficient water to transport efficiently produce from truck or primary flume port 14 to processing port 15. In order to control foam, the temperature of the aqueous medium, contained in the flume 11 or in the tank 12 or in any line 17 or 18 carrying aqueous medium in the process, can be measured. The temperature of the medium 24 in tank 12 is measured using thermocouple or thermistor 25. At the same time, any foam generated from the aqueous medium in any portion of the process equipment can be measured to control foam. FIG. 1 shows a temperature measurement of foam 19 in tank 12 using a thermal infrared detector 20. We have found that the foam layer has an apparent temperature typically substantially less than the temperature of the aqueous medium. The infrared detector 20, or a series of detectors, measures the temperature of the foam layer 19 if any and compares the temperature of the foam layer 19 to the temperature, as measured by thermistor or thermocouple 25, of the aqueous medium 24 in the tank 12. An electronic controller 21 compares the temperature of the foam layer 19 to the temperature of the aqueous medium 24 in the tank 12 and if that temperature is greater than a predetermined limit, the controller causes a source of defoaming agent 22, using a pump 23, to introduce an effective foam controlling concentration of the defoaming agent in the aqueous medium in tank 12. The foam control agent can be added to the aqueous medium at any point in the process stream, however, it is more convenient to add the foam control agent close to the IR sensor 20 that detects the foaming characteristics of the aqueous medium in the tank 12.

Figure 2:
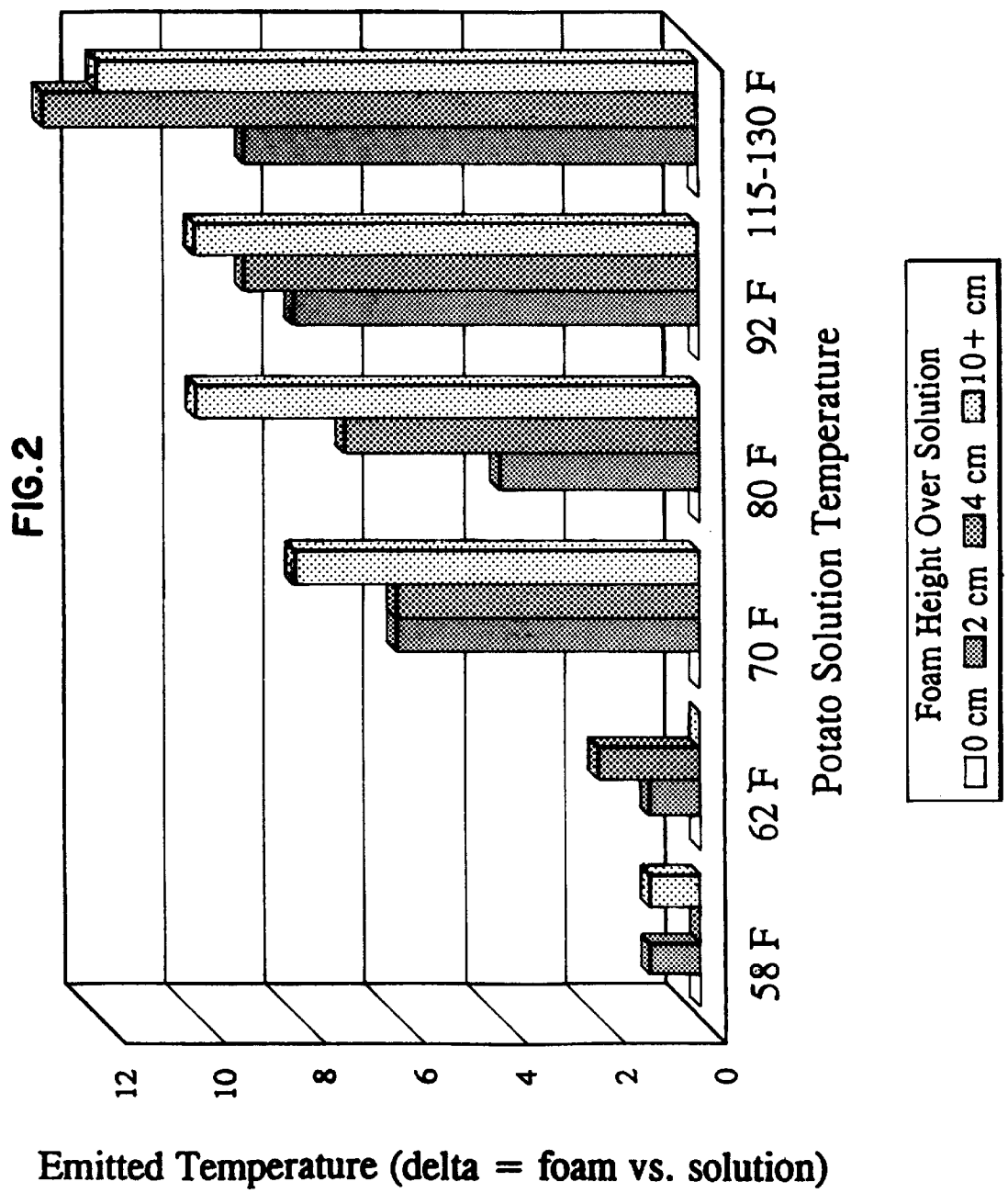
FIG. 2 is a representation of data in a graphical form showing that above a certain temperature, the measurement of an infrared emission of a foam can be an effective way of measuring the thickness of a foam layer above an aqueous medium.

FIG. 2 is a graphical representation of the results of experimentation done with respect to the process of the invention. This experiment utilized a heat detecting IR gun placed over a circulating aqueous potato effluent stream which generated a foam by mechanical circulation. The potato effluent had been obtained from a commercial potato processing plant. The data demonstrates the insulating effect, at various temperatures, for various foam heights generated in an aqueous transport system pumping potato water.

Figure 3:
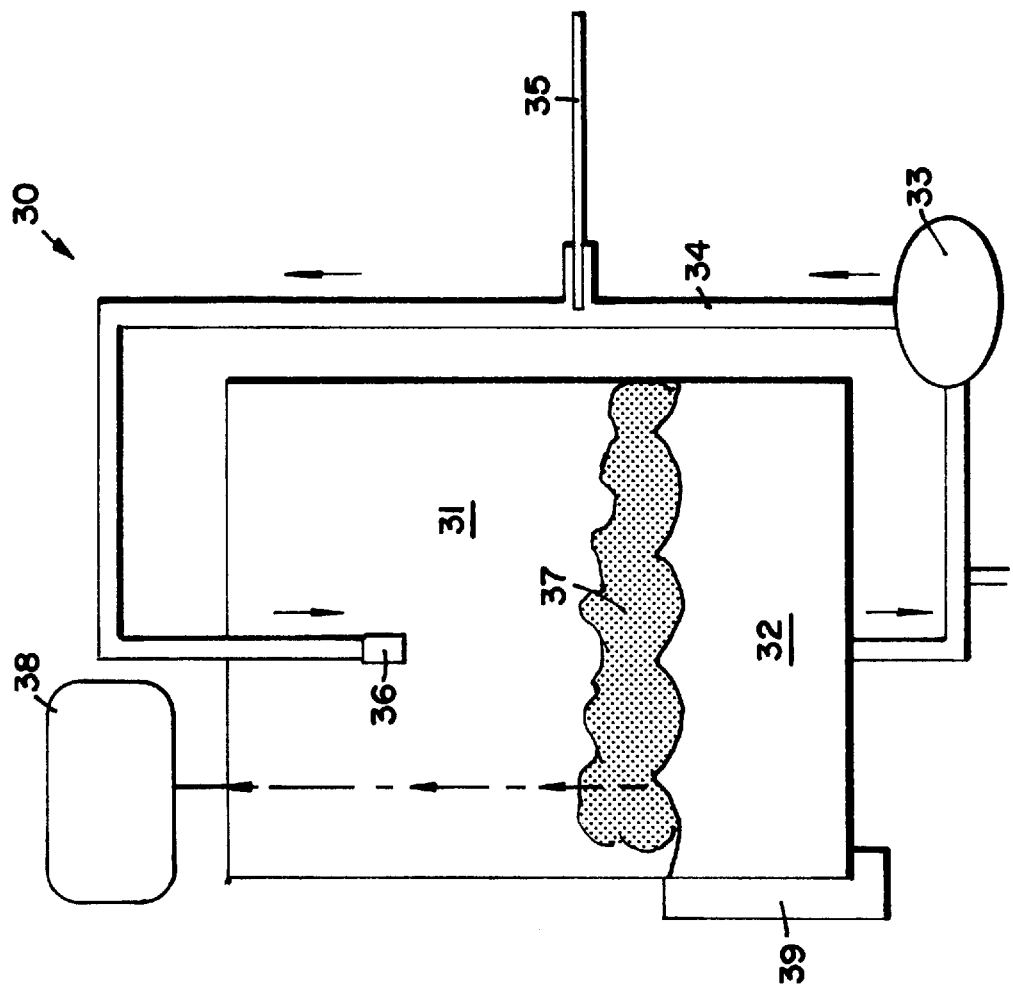
FIG. 3 is a sketch of a foam generating apparatus used to generate the data in FIG. 2.

FIG. 3 shows the apparatus 30 used in generating the data shown in FIG. 2. FIG. 3 shows apparatus 30 comprising a holding chamber 31 containing about 3 liters of potato effluent 32. The potato effluent 32 is pumped using pump 33 through line 34 containing a column thermometer 35. The potato effluent is returned to the chamber 31 through outlet 36. A foam layer 37 is generated by the mechanical pumping and transfer of the potato effluent. An infrared detector 38 is installed in the holding chamber to detect the temperature of the foam layer 37. The effluent 32 can be heated or cooled using temperature control means 39.

In producing the data of FIG. 2, a commercial potato effluent defoamer was manually added to the commercial potato effluent defoamer is the GWPD-655 defoamer (a silica\silicone\nonionic mixture) used at about 500–1000 ppm of defoamer based on the total effluent volume. In conducting the experiment that generated the data shown in FIG. 2, the foam was permitted to form, the defoamer was added to break the foam. An infrared temperature was recorded for the foam and for the defoamed effluent. At each temperature, the difference between the foam temperature and the aqueous medium temperature was noted. As temperature of the aqueous medium increases, the difference between the foam temperature and the aqueous medium temperature becomes greater. This data shows that at temperatures above about 70° F., the infrared temperature of the foam can be used as a detection means to show the presence of foam for the purpose of defoaming the solution or effluent using a defoaming composition.

The data shows that at about 70° F., there is a significant, greater than about 2° F. temperature difference, between the aqueous medium effluent and an approximately 2 centimeter foam layer. Below 70° F., some difference is shown even with thick foam heights. However, depending on food source, soil concentration and other aqueous components, the differences in temperature between the aqueous medium and the foam may not be sufficient to be used as a control indicator. However, at temperatures greater than about 70° F., the magnitude of difference in temperature between the foam and the aqueous medium is sufficient for control purposes.

Figure 4:
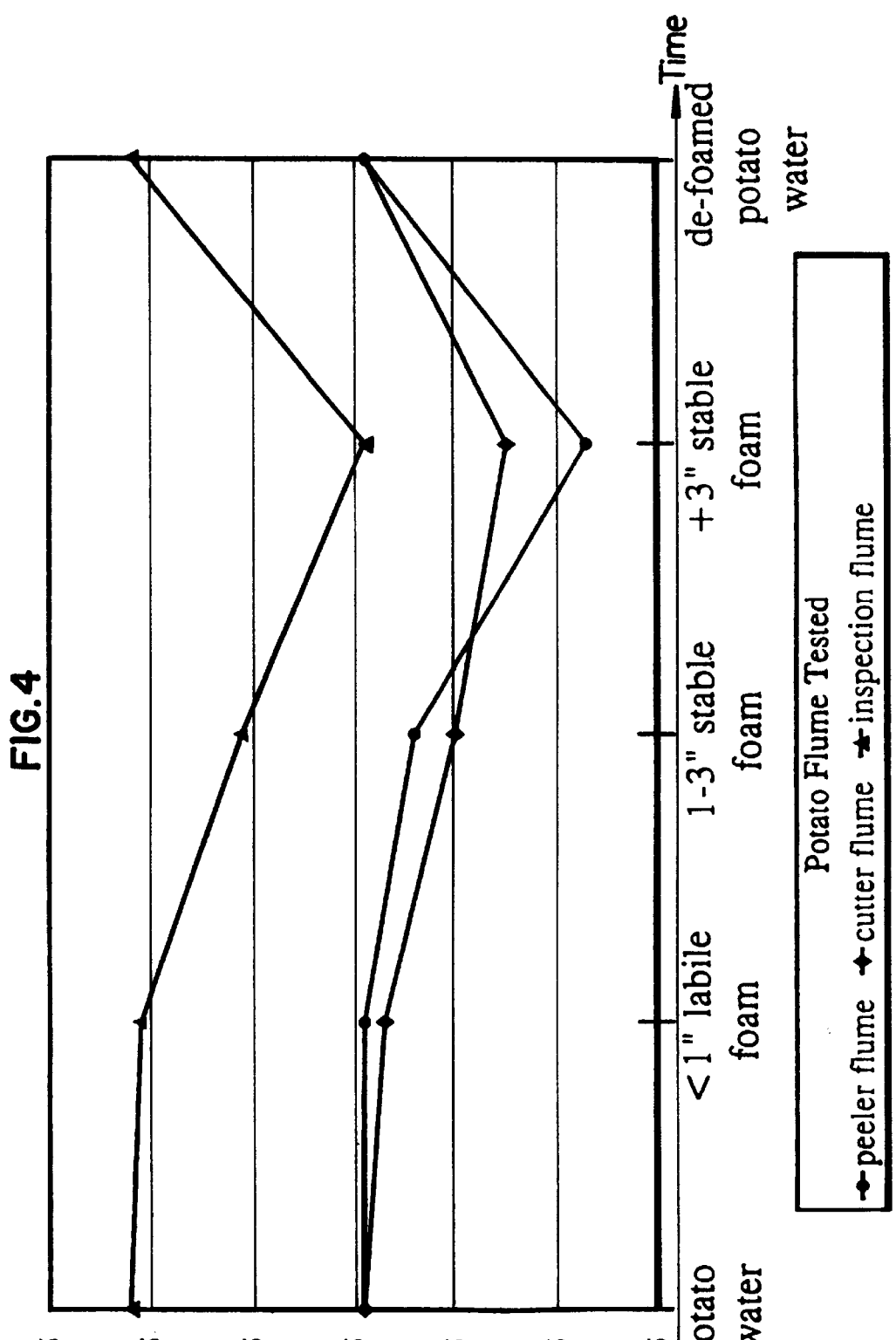
FIG. 4 is a graphical representation of the temperature characteristics of a variety of types of foam generated.

FIG. 4 graphically represents infrared emission data taken from three transport flumes at a potato processing plant. The transport flumes containing a defoamer composition were operated and a condition of freedom from substantial foam was attained. The temperature of the various flume effluents were measured, then the addition of a defoamer material was interrupted in order to generate foam. FIG. 4 shows data for three aqueous flumes including a potato peeler flume, a potato cutter flume and a potato inspection flume. The vertical dimension is temperature and the horizontal dimension is time. The data shows that for all three flumes, with a low level of foam (shown in FIG. 4 as less than one inch labile foam that is dynamically formed and broken, and thus acceptable for pump operation) that little heat difference is recorded when compared to the potato water (defoamed condition). Thus, the thin dynamic foam has little thermal insulating effect and does not trigger the addition of defoaming materials. After a short time without defoamer addition, the foam began to change in stability and character. A stable relatively dense foam layer began to foam shown as a 1–3 inch stable foam. With all three flume systems tested, this data shows a thermal insulating effect of about 5°–11° F. difference between the foam and the aqueous medium was found. While this level of foam did not prevent the proper operation of the flume, we consider this level of foam to be sufficient to begin defoaming to ensure that no improper operation of the pumps or other aspects of the flume occurred. Without addition of defoamer, a considerable level of stable foam was formed in each of the flumes designated as a 3+ inch stable foam. An increased temperature difference between the aqueous medium (potato water) and the stable foam was noted (quantitatively about 14°–23° F.). At this level of foaming, cavitation of the flume pumps began. Defoamer was added manually. The flume temperatures recorded showed that foam was substantially reduced and the surface temperature IR emission of the surface returned to that of the aqueous medium or defoamed potato water.

Figure 5:
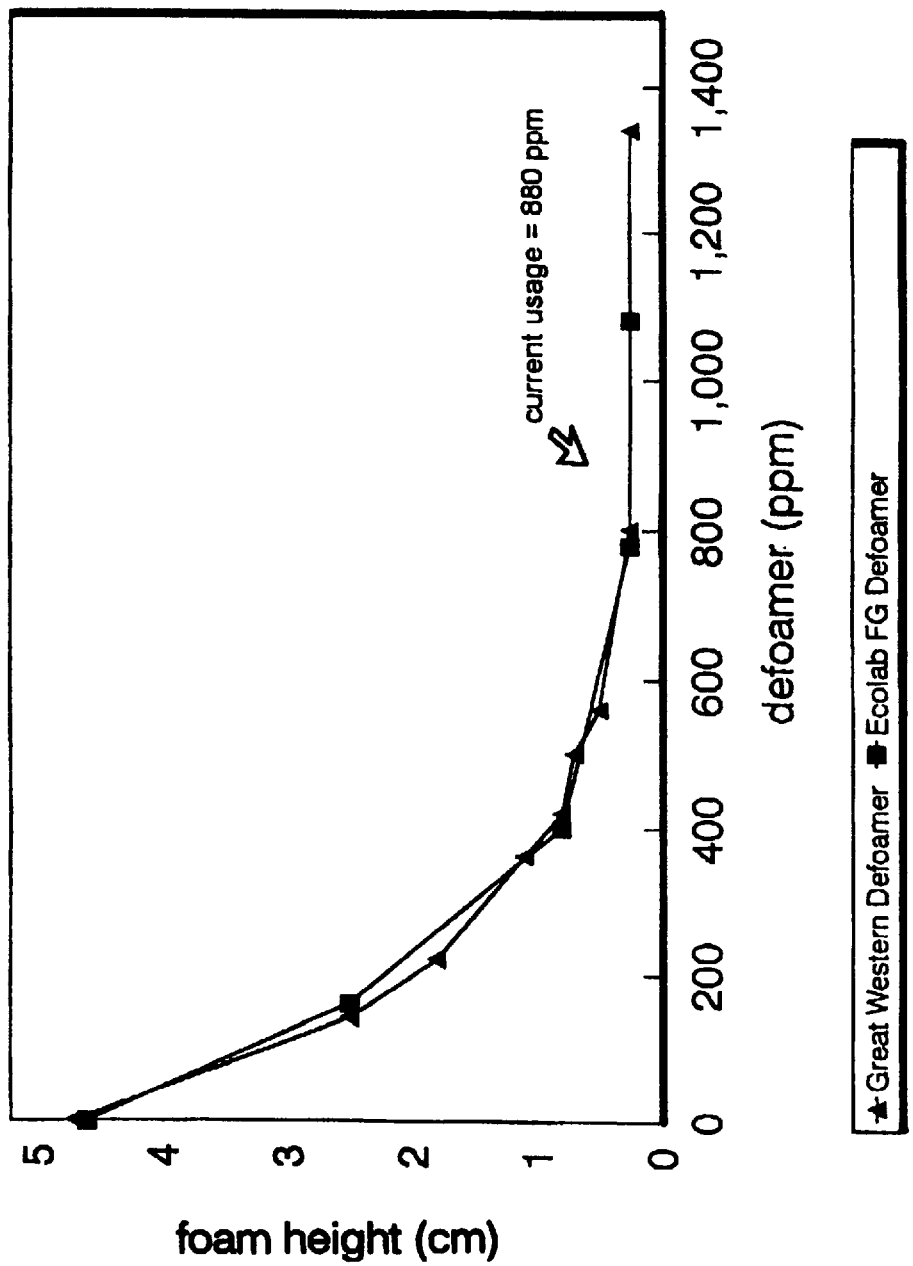
FIG. 5 is a graph showing effective control of foam using about 800 ppm of a silica/silicone/nonionic wetting agent combination defoaming material.

FIG. 5 shows an experiment using two defoaming materials in defoaming potato peeler water in a commercial facility. FIG. 5 shows the reduction in foam height resulting from the use of varying concentration of one of two defoamer materials. The curves show that as the defoaming material is added to the peeler water, the foam height is decreased to less than one inch at 400 ppm defoamer. The foam height reaches a constant height of about 0.25 inch at 800 ppm defoamer.

Figure 6:
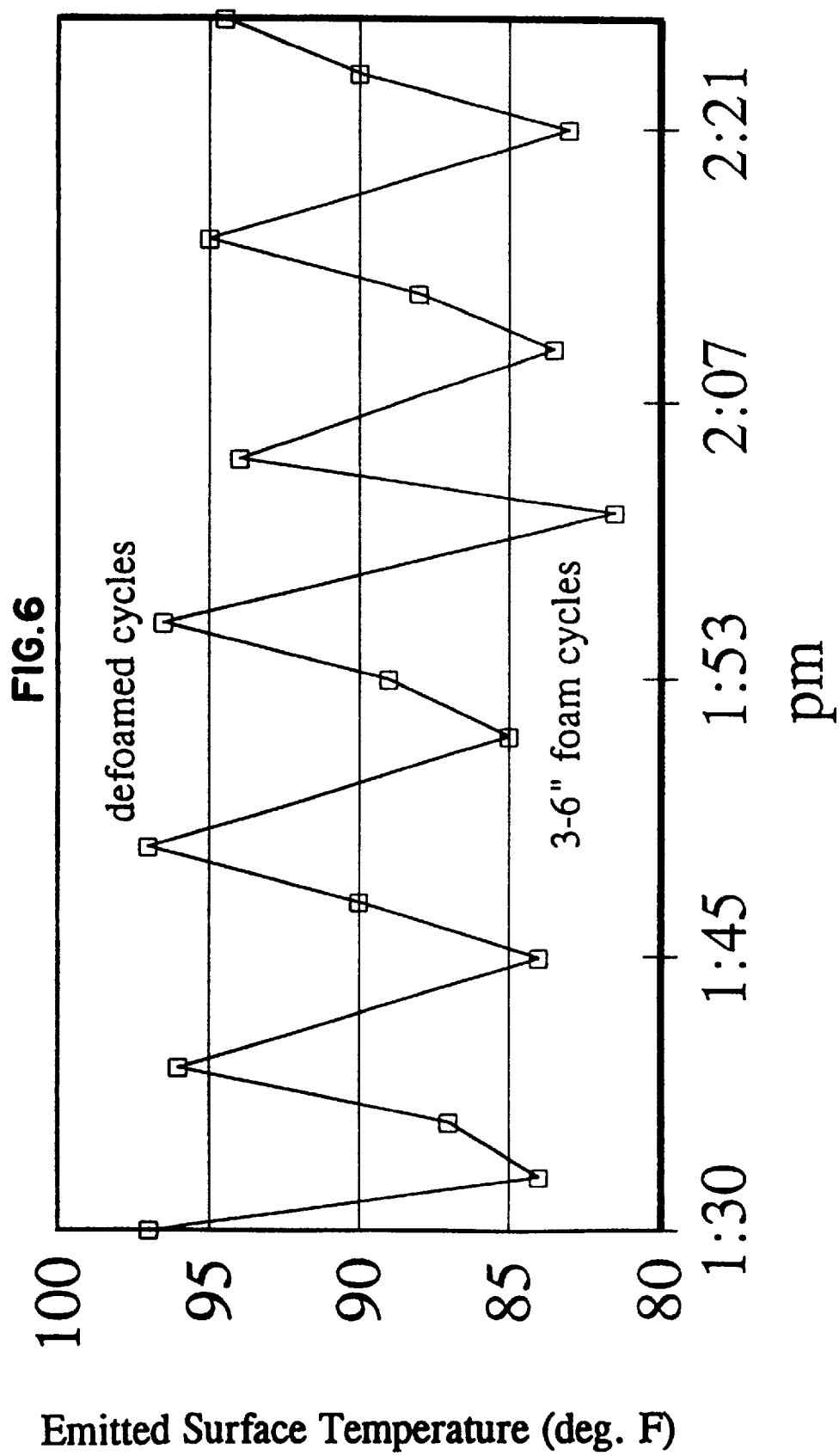
FIG. 6 is a graphical representation of a cyclic defoaming operation showing a cyclic temperature variation that parallels the cyclic generation of a foam layer.

FIG. 6 represents data obtained from one flume (a potato peeler flume). A multiple set of foam/defoam cycles were performed to simulate a commercial foam control system. An infrared emission recorder was placed 8 feet over the flume (foam layer) surface and the surface temperature was recorded. In the cycles shown in FIG. 4, the flume foam was totally removed using the addition of about 800 parts of an aqueous defoamer composition (GWPD-655) per million parts of the flume water and the temperature was read after defoaming. The defoamed aqueous medium had a surface temperature or emission of about 94°–97° F. The foam was permitted to accumulate to produce a foaming layer about 3–6 inches in depth. As the foaming layer increased, the apparent temperature of the surface of the aqueous medium insulated by the foam substantially dropped greater than 10° F. The temperature changes from about 96° F. to about 84° F. producing a surface difference of about 8°–15° F. difference. As the defoamer material was introduced into the aqueous medium, often in two proportions, the foam was reduced in an intermediate step and totally defoamed as shown on the graphs. These cycles were repeated in a series of cycles to show the use of an infrared sensor to control defoamer composition addition and foam control.

Figure 7:
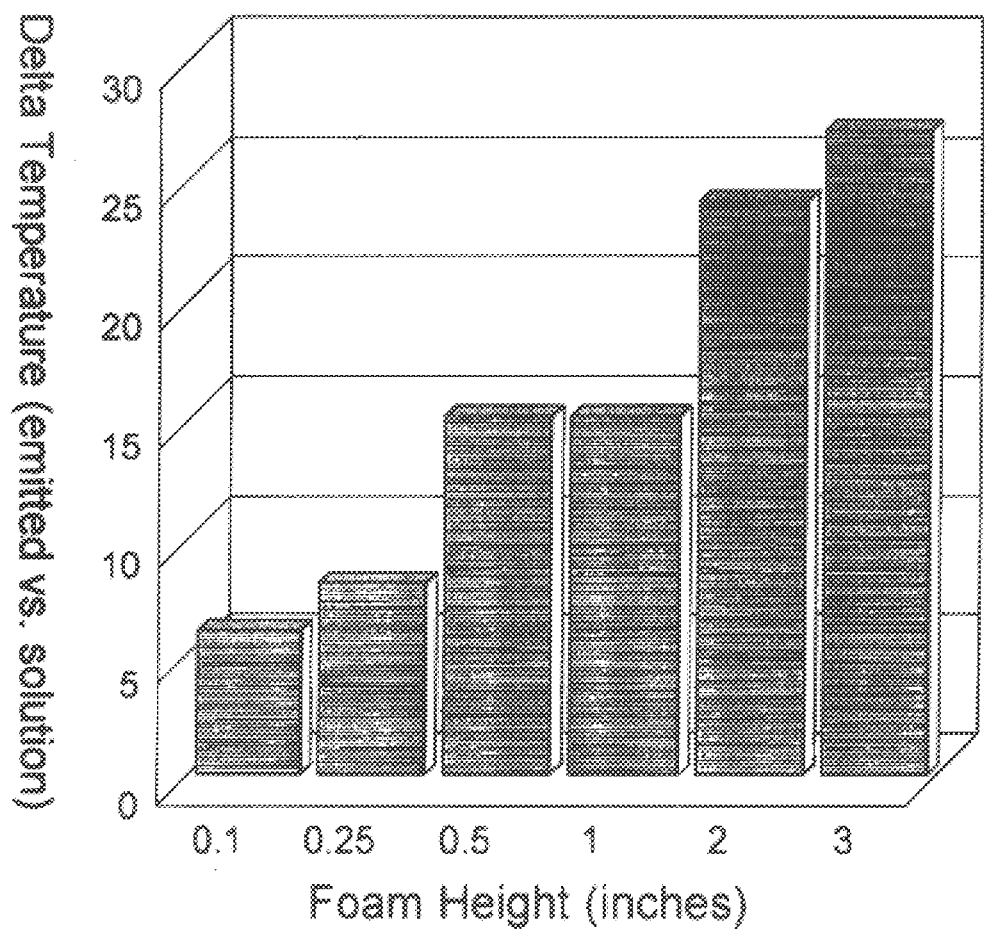
FIG. 7 illustrates the results of our research on the effect on infrared emissions from automatic warewashing aqueous systems with a foam layer.

FIG. 7 illustrates the results of our research on the effect on infrared emissions of aqueous systems with a foam layer. The figure shows that in foams generated in a warewashing machine having a foam that derives from milk and surfactant cleaning residues, relatively thin film layers can cause significant differences in measurement of temperature between bulk liquid and foam surface. These results demonstrate that a substantial increase in temperature difference between the bulk solution phase and a film phase can be created. Even a relatively thin film less than 0.5 inch can result in a substantial about 13° F. temperature difference and, larger temperature deltas are often obtained with increasing foam thickness.

Figure 8:
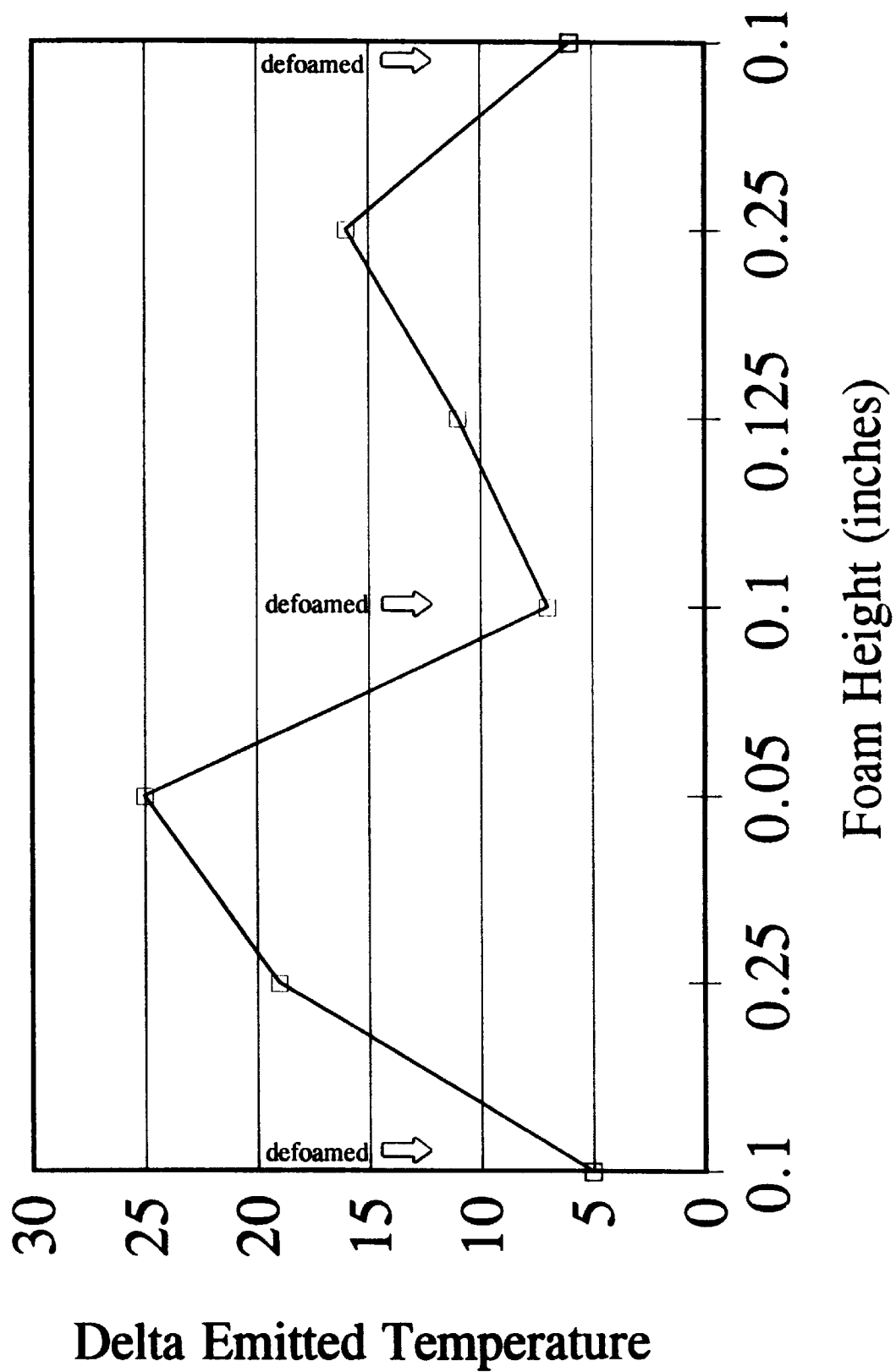
FIG. 8 shows the results from a similar experiment with simulated egg washing apparatus and egg and detergent residues can cause excessive foaming.

FIG. 8 shows the results from a similar experiment with simulated egg washing apparatus layer egg and detergent residues can cause excessive foaming. The results of the experiment demonstrate that a foaming cycle where low levels of defoamed egg foam (0.1 inch) have relatively low thermal difference (bulk solution phase versus IR emission from foam) while greater levels of added egg foam (rated as then 0.125 inch) yield substantially increased temperature differences (7°–25° F.) when comparing the bulk aqueous liquid to the foam layer.

DEFOAMING EVALUATION

The defoaming efficiency of the process of this invention and of comparative compositions was determined in a Glewwe Foam meter which provides a dynamic foam test rather than a static test (as in the case of the Ross-Miles foam test). A dynamic foam meter is considered more appropriate for simulation of industrial conditions, e.g. the conditions in a flume. The equipment and general procedure for the Glewwe form test is described in U.S. Pat. No. 3,899,387, column 12, line 45 et seq. The foam meter itself consists of a thermostated reservoir and a pump to recirculate the aqueous medium with foaming tendencies. The foam developed by the action of the aqueous stream impinging on the surface in the reservoir causes foam formation. The foam height is measured after various time intervals and provides a relative measure of the effectiveness of the defoamer added to the black liquor. In all cases, 3,000 ml of the medium was used. the reservoir of this foam meter consists of a stainless steel laboratory beaker of 3,000 ml capacity. Sealed to this beaker by means of a silicone sealant is a clear Plexiglass tubing which snugly fits into the inner walls of the beaker. This enables the operator to measure the foam height above the liquor level. The beaker measures about 19 cm high by about 17 to 18 cm in diameter and the Plexiglass tube extends about 30 to 35 cm above the lip of this beaker. Detail regarding the Glewwe foam test is shown in Steindorf, U.S. Pat. No. 5,447,648, which is expressly incorporated by reference herein.

The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for controlling foam in an aqueous medium subject to foaming, the medium contained in a system, which method comprises:
   (a) obtaining a measure of the thermal infrared emission of a foam derived from the aqueous medium;
   (b) comparing a temperature of the aqueous medium to a temperature derived from the measure of the thermal infrared emission of the foam; and
   (c) when the difference between the temperature of the aqueous medium and the temperature of the foam is greater than a predetermined limit, defoaming the aqueous medium.

2. The method of claim 1 wherein the defoaming of the aqueous medium is achieved using an defoaming process.

3. The method of claim 1 wherein the temperature of the aqueous medium is determined using a constant pre-set temperature set by the system.

4. The method of claim 1 wherein the infrared emission is measured with a quantum IR detector.

5. The method of claim 1 wherein the infrared emission is measured with a thermal IR detector.

6. The method of claim 1 wherein the aqueous phase is maintained at a constant temperature set point, and that set point temperature is taken as a measure of the temperature of the medium.

7. The method of claim 1 wherein the temperature of the aqueous medium is determined by obtaining a measurement of the thermal infrared emission of the aqueous medium.

8. The method of claim 7 wherein a portion of the aqueous medium is mechanically maintained free of foam to measure its temperature using the thermal infrared emission of the aqueous medium.

9. The method of claim 1 wherein the temperature of the aqueous medium is measured with a thermometer or a thermistor, and that temperature is used to generate a measure of the temperature of the aqueous medium.

10. The method of claim 9 wherein the thermometer comprises a mercury column or alcohol column thermometer.

11. The method of claim 9 wherein the thermometer comprises a thermocouple thermometer.

12. The method of claim 1 wherein the defoaming of the aqueous medium is achieved using an aqueous treatment that forms an effective concentration of a foam control agent in the aqueous medium.

13. The method of claim 12 wherein the predetermined limit is greater than 2° C. and the effective concentration of foam control agent is about 5 to 2500 parts by weight of agent per million parts by weight of medium.

14. The method of claim 12 wherein the predetermined limit is greater than 5° C. and the effective concentration of foam control agent is about 50 to 2000 parts by weight of agent per million parts by weight of medium.

15. The method of claim 12 wherein the predetermined limit is greater than 10° C. and the effective concentration of foam control agent is about 150 to 1500 parts by weight of agent per million parts by weight of medium.

16. The method of claim 1 wherein the aqueous medium comprises organic matter, inorganic matter or both, in the aqueous medium.

17. The method of claim 16 wherein the organic matter comprises an organic polymer.

18. The method of claim 16 wherein the organic matter comprises vegetable matter.

19. The method of claim 16 wherein the organic matter comprises a surfactant.

20. A method for controlling foam in a foamable aqueous medium subject to foaming, the medium containing agricultural matter and an antimicrobial composition, which method comprises:
   (a) measuring the temperature of an aqueous medium;
   (b) measuring the infrared emission of a foam derived from the aqueous medium;
   (c) comparing the temperature of the aqueous medium to a temperature derived from the infrared emission of the foam; and
   (d) when the difference in temperature between the foam and the medium is greater than a predetermined limit, forming an effective concentration of a foam control agent in the aqueous medium.

21. The method of claim 20 wherein the temperature of the aqueous medium is determined by obtaining a measurement of the infrared emission of the aqueous medium.

22. The method of claim 20 wherein the difference between the temperature of the aqueous medium and the temperature of the foam is greater than 2° C. and the effective concentration of foam control agent is about 50 to 2500 parts by weight of foam control agent per million parts by weight of aqueous medium.

23. The method of claim 20 wherein the difference between the temperature of the aqueous medium and the temperature of the foam is greater than 5° C. and the effective concentration of foam control agent is about 100 to 2000 parts by weight of foam control agent per million parts by weight of aqueous medium.

24. The method of claim 20 wherein the aqueous phase comprises a polymeric material.

25. The method of claim 20 wherein the emission is measured with a quantum IR detector.

26. The method of claim 20 wherein the emission is measured with a thermal IR detector.

27. The method of claim 20 wherein the aqueous phase is maintained at a constant temperature set point, and that set point temperature is taken as the temperature of the medium.

28. The method of claim 20 wherein a portion of the aqueous medium is mechanically maintained free of foam to measure the infrared emission of the aqueous medium.

29. The method of claim 20 wherein the temperature of the aqueous medium is measured with a thermometer or electronic thermistor.

30. The method of claim 20 wherein the thermometer comprises a mercury or alcohol column thermometer.

31. The method of claim 20 wherein the thermometer comprises a thermocouple driven gage thermometer.

32. The method of claim 20 wherein the difference between the temperature of the aqueous medium and the temperature of the foam is greater than 10° C. and the effective concentration of foam control agent is about 200 to 1500 parts by weight of foam control agent per million parts by weight of aqueous medium.

33. The method of claim 32 wherein the agricultural matter comprises freshly picked vegetable produce.

34. The method of claim 20 wherein the aqueous medium is a mobile aqueous phase in a flume system.

35. The method of claim 34 wherein the agricultural matter comprises fruit produce.

36. The method of claim 20 wherein the antimicrobial composition comprises a peroxy antimicrobial.

37. The method of claim 36 wherein the peroxy antimicrobial comprises a peroxy acid or an ozone containing composition.

38. The method of claim 36 wherein the peroxy antimicrobial comprises a peracetic acid composition.

39. The method of claim 38 wherein the peracetic acid composition also comprises a hydrogen peroxide composition.

* * * * *